May 11, 1943.　　　T. S. DIVER　　　2,318,931
THROTTLE CONTROL DEVICE FOR MOTOR VEHICLES
Filed May 20, 1941　　　2 Sheets-Sheet 1

May 11, 1943.　　　　T. S. DIVER　　　　2,318,931
THROTTLE CONTROL DEVICE FOR MOTOR VEHICLES
Filed May 20, 1941　　　　2 Sheets-Sheet 2

Thomas S. Diver,
INVENTOR.

BY

Patented May 11, 1943

2,318,931

UNITED STATES PATENT OFFICE 2,318,931

THROTTLE CONTROL DEVICE FOR MOTOR DRIVEN VEHICLES

Thomas S. Diver, Geneva, Ohio

Application May 20, 1941, Serial No. 394,251

8 Claims. (Cl. 192—.01)

This invention relates to improvements in control devices, for supplying gas and other combustible fuel thru a carburetter or other mechanical valve, to the engines of automobiles and other motor driven vehicles.

An object of this invention is to provide an automatic controlled device, to regulate a steady flow of fuel to the engines of motor driven vehicles, without the use of hand operated controls.

A further object of this invention is to provide an automatic device, that will hold the fuel feeding apparatus at any open position, to attain any travelling rate of speed desired, injecting a steady even flow of fuel to the motor of a vehicle, eliminating an uneven supply of fuel causing a jerky ride.

Another object of this invention, is to provide an automatic control device, that after the desired speed of the motor vehicle is attained, the operator can maintain that speed without constant pressure on the fuel feeding apparatus.

A further object of this invention, is to provide a device automatically controlled, for use in combination with the accelerator or throttle pedal, to hold the fuel feeding apparatus operated with the foot, open at any depressed position, eliminating foot and leg ache, thru the necessity of constant pressure as is customary with devices now used.

A further object of this invention, is to provide an automatic control device, that can be made operative with a slight touch of the operator's foot, to hold the throttle pedal depressed, or the fuel feeding apparatus open and one that can instantly be made inoperative, by quickly depressing the throttle pedal to the floor, or fully depressing the clutch pedal.

Still a further object of this invention, is to provide a device, that will automatically idle the speed of the motor the same as removing pressure by the foot upon the throttle pedal used in automobiles, trucks and other vehicles operated on the same principle, by slightly depressing the clutch or brake pedal.

A further object, is to provide an automatic throttle control device, that can be installed with equipment now in use on all motor driven vehicles, one that can be installed in the manufacture and a device that will operate reasonably well upon any motor driven vehicle using a throttle pedal and a throttle control rod.

And a further object, is to provide a device of the kind, to eliminate the hand controlled throttle button on the instrument panel of most present day motor driven vehicles and one that can be manufactured at a very nominal cost.

Other advantages will appear in the following specification and all novel features will be pointed out in the appending claims.

An embodiment of this invention, is shown in the drawings herewith, which form a part of this application in which;

Figure 1 is a top view of the cup shaped case.

Figure 2 is a view of the throttle pedal control rod.

Figure 3 is a view of a coil spring for assembly into the cup shaped case.

Figure 4 is a top elevation of the metal disc or holding means.

Figure 5 is a view of the control release lock shaft.

Figure 6 is a top elevation of the cover plate.

Figure 7 is a side elevation of the cup shaped case with Figures 2 to 6 inclusive assembled.

Figure 8 is an end view of Figure 7.

Figure 9 is an enlarged sectional elevation of Figure 8, on a plane of the line 9—9 of Figure 8.

Figure 10 is an enlarged sectional elevation of Figure 7 on a plane of the line 10—10 of Figure 7.

Figure 11:
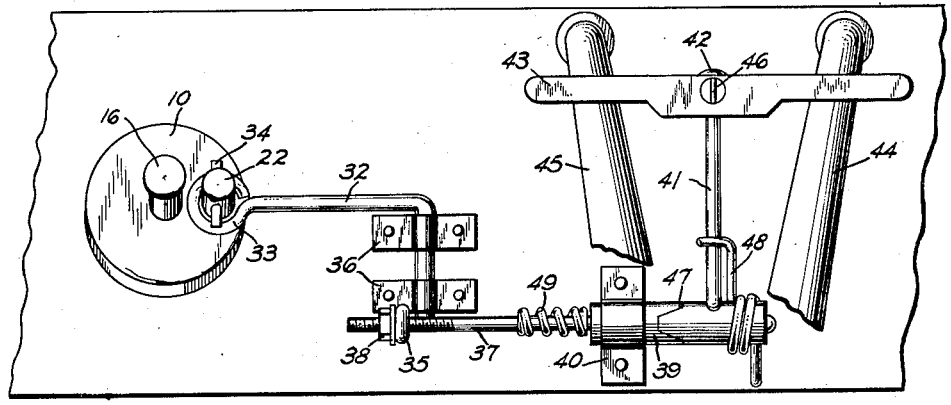
Figure 11 is a view of the under floor-board assembly.

Referring to the drawings, it will be seen this automatic throttle control device consists of a cup shaped metal body 10, with a flanged top 11, aperture guides 13 and 14 in the base of the cup and a bar or means 15 offset from the center, fixedly fastened between the top and base, to the wall inside the said cup, shown in Figure 1. Apertures 12 in the flange are for assembly.

In Figure 2 I have shown the throttle pedal control rod 16, the upper end of which is bossed, is inserted thru aperture guide 14 in the base of the cupped case 10. Figure 3, a loosely coiled spring 17, is placed over the bossed end of the throttle pedal control rod 16 resting in the base of the cupped case 10. Figure 4 shows a disc or holding means 18 with a U slot 19 on the edge, a tail section 20 remote from said U slot, with an oval aperture 21 in the center, the said disc is inserted into the cup shaped case 10, with the tail section 20 under the bar or means 15, over the spring 17 and the throttle pedal control rod 16, continues thru the oval aperture 21 in the disc or holding means 18. The control release lock shaft 22, shown in Figure 5, is inserted thru the U slot 19, in the disc or holding means 18 and thru the aperture guide 13 in the base of the cupped body 10, with the pin 23 horizontally thru the center, resting on the upper side of the disc 18, shown in Figure 10, an enlarged sectional elevation of Figure 7 on a plane of the line 10—10 of Figure 7.

Figure 6 depicts a cover plate 26, with an oval aperture 27 in the center, thru which is projected the bossed end of the throttle pedal control rod 16 and aperture seat 28, thru which projects the upper end of the control release lock shaft 22, a threaded adjustment cap 25 is assembled to the upper end of the said control release lock shaft and a miniature coil spring 29 is inserted in aperture 28 of the cover plate 26 behind the control release lock shaft 22, shown in Figure 8, the said cover plate 26 is assembled to the flanged top 11, of the cupped case 10 with threaded studs inserted thru apertures 12 in the flanged top and 12A in the cover plate shown in Figure 7.

In Figure 10 I have shown an enlarged sectional elevation of Figure 7, on a plane of the line 10—10 of Figure 7, to clarify the assembly and simplify the understanding and cooperation of the units comprising the device. Reference to Figure 8, the notch 24 in the control release lock shaft 22 is dislodged from aperture seat 28 in the cover plate 26, causing the upward movement of the disc or holding means 18 thru pressure of the coil spring 17, shown in Figure 9, said disc being anchored under the bar or means 15 in the cupped body 10. The upward movement of the disc or holding means 18, grips the throttle pedal control rod 16 at the oval aperture 21 in said disc or holding means thru which said rod projects and so long as the disc or holding means 18 is free from pressure of the pin 23 in the control release lock shaft 22, the said disc or holding means 18 can move up and down as if hinged, allowing the throttle pedal control rod 16 to move downward, the disc or holding means 18 gripping it on the upward movement at aperture 21 of the said disc or holding means, thru pressure of the coil spring around the throttle pedal control rod 16 and under the disc or holding means 18. Depressing the control release lock shaft 22, forces the disc or holding means 18 down by the pin 23 therethru, releasing the grip of the oval aperture 21 in the disc or holding means 18 on the throttle pedal control rod 16, allowing the upward movement of said rod.

Referring to Figure 10, the control release lock shaft 22 is shown with the notch 24 therein seated in aperture seat 28 of the cover plate 26, holding the disc or gripping means 18 horizontal with the base of the cupped case 10, releasing all pressure upon the throttle pedal control rod 16; allowing said rod to move up and down freely thru aperture 14 in the cupped case 10, oval aperture 21 in the disc or gripping means 18 and oval aperture 27 in the cover plate 26.

Figure 12:
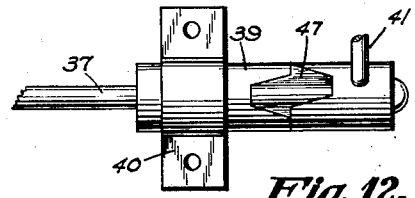
Figure 12 shows the cylindrical cam coupling open.

In Figure 11, I have shown the mechanism on the under side of the floor-board 31 of a motor vehicle to operate the control release lock shaft 22 with the clutch and brake pedals 44 and 45, consisting of a formed rod 32 with an eye 33 at one end loosely fitted to the lower end of the control release lock shaft 22 extending thru the base of the cupped body 10, with a pin 34 inserted thru the end of said shaft, the remote end of rod 32 having an eye 35 extending downward from the floor-board 31, said rod is fastened into position with loosely fitted bearing cleats 36 attached to the floor-board 31 allowing free manipulation of said rod. A formed rod 37 threaded at one end is inserted into eye 35 of rod 32 with a nut 38 for adjustment, the remote end of rod 37 being assembled thru a cylindrical cam coupling 39, fixedly fastened to the floor-board with a cleat 40. A rod 41 fixedly fastened to the cylindrical wall of the said coupling with an eye 42 at the remote end thereof, to which is assembled a bar 43 extending across the under side of the clutch and brake extension arms 44 and 45, said bar is affixed in place with a threaded stud 46. Depressing either the clutch pedal 44 or the brake pedal 45 forces the bar 43 down, opening the seat 47 in the cam coupling 39 (shown in Figure 12) thereby manipulating rod 32 drawing down the control release lock shaft 22, the same as depressing it from the top, a coil spring 48 around the movable end of the cam coupling 39, returns bar 43 to its original position and a coil spring 49 threaded upon rod 37, draws the said cam coupling into its seat 47 when tension is removed from the clutch and brake pedals 44 and 45.

Figure 13:
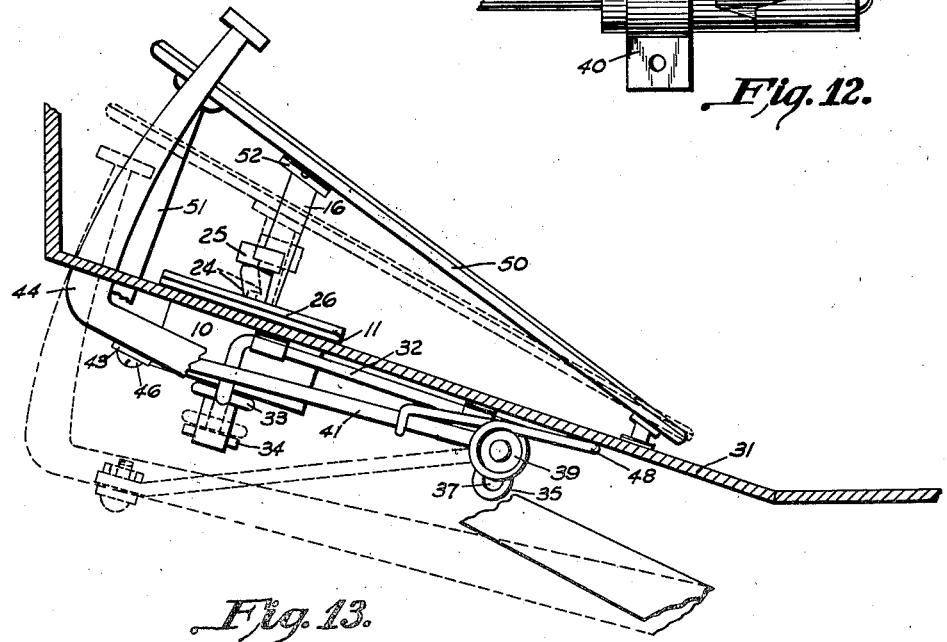
Figure 13 shows above and below the floorboard assembly of the automatic throttle control device and the combination with the throttle, clutch and brake pedals.

In Figure 13 I have shown the floor-board 31, a throttle pedal 50 to which is attached a control rod 51, used to operate the fuel supply of modern motor driven vehicles, the cup shaped body 10, into which is assembled the units shown in Figures 2 to 5 consisting of a throttle pedal control rod 16, a coil spring 17, a disc or gripping means 18 and a control release lock shaft 22 with a cover plate 26 comprising this automatic throttle control device is inserted thru or attached to the under side of the floor-board 31 beneath the throttle pedal 50 and fixedly fastened with studs 30, the bossed end of the throttle pedal control rod 16 is assembled to the under side of the throttle pedal 50 with a coupling means 52. Referring to Figure 10, the notch 24 in the control release lock shaft 22 is shown seated into aperture seat 28 in the cover plate 26. Dislodging notch 24 from the said seat 28 causes the said disc or gripping means 18 to raise thru pressure of the coil spring 17, said disc or gripping means on the upward movement, grips by friction the throttle pedal control rod 16 as formerly stated. The throttle pedal control rod 16 attached to the throttle pedal 50, is forced downward with the said pedal, as shown by the broken lines of the pedal, increasing the fuel supply to the motor regulating the speed of travel and the operator's foot can be removed from the said pedal when the desired speed is attained and an even flow of fuel is continued until the throttle pedal control rod 16 is released by slightly depressing the clutch or brake pedals 44 and 45 as shown by the broken lines of extension arm 44 depressed. This action of the pedals forces down rod 41 attached to the wall of the cylindrical cam coupling 39 opening the seat 47 in the said coupling, (shown in Figure 12) the formed rod 37, loosely fitted thru the cam coupling 39 and assembled thru eye 35 extending downward from the floor-board 31, manipulates formed rod 32 when the said cam coupling is forced open and eye 33 assembled to the lower end of the control release lock shaft 22 draws the said shaft down as stated before, forcing the disc or holding means 18 down also, releasing the grip of oval aperture 21 in the said disc or holding means on the throttle pedal control rod 16, allowing the throttle pedal 50 to return to its original position as before depressing, lessening the fuel supply to the motor.

To render this device ineffective, quick depression of the throttle pedal 50 to the floor-board 31, forces the control release lock shaft 22 down and notch 24 therein seats into aperture seat 28 of the cover plate 26 by the pressure of the miniature spring 29, shown in Figure 8. The same result can be obtained by depressing the clutch pedal 44 to the floor as when shifting gears. When notch 24 in the control release lock shaft 22 is seated as shown in Figure 10, it brings in line guiding aperture 14 in the base of the cup body 10, oval aperture in the disc or holding means 18 and oval aperture 27 in the cover plate 26, freeing the throttle pedal control rod 16 to allow it to move up and down freely as before installation of my device.

Altho this invention has been described in considerable detail, such description is intended as illustrative rather than limiting as the creation may be variously embodied.

Various changes can be made as long as they fall within the scope of this invention.

Having thus described my invention, I claim:

1. In a throttle control device, the combination with a throttle pedal, a cup shaped metal case flanged at the top, two guiding apertures in the base of the cup, a bar or means affixed to the inner wall between the top and base, a loosely coiled spring perpendicular between a metal disk anchored under said bar or means and base of the cup, a control rod with a slightly flanged base having a bossed top or head projected thru the center guiding aperture in the base of said cup, thru the spring and oval aperture in the said disc.

2. In a throttle control device, the combination with a throttle pedal, a cup shaped metal case with a flanged top, two guiding apertures in the base, a bar or means affixed to the inner wall between the top and base of the cup, a metal disc anchored under the said bar or means, a perpendicular spring between the said disc and base of the cup, a control rod bossed at the top projected thru the centered guiding aperture in the base of the cup, thru the coil spring and oval aperture in the disc, a control lock shaft with an adjustment cap at the top end, a notch below said cap, a horizontal pin thru the center, said shaft projected thru the U slot on the edge of the disc and the offset guiding aperture in the base of the cupped case, with the said pin thru the control lock shaft resting on the upper side of the said disc extending beyond each side of the U slot.

3. In a throttle control device, the combination with a throttle pedal of a motor vehicle to hold the accelerator mechanism at any set position, a cup shaped metal case, two guiding apertures in the base, a bar or means affixed to the inner wall of the cup, a metal disc or gripping means with an oval aperture in the center thereof inserted into the said cupped case, a coil spring below the disc and a throttle pedal control rod projected thru the centered guiding aperture in the base of the cup thru the coil spring, the oval aperture in the said disc and attached to the under side of the throttle pedal.

4. In a throttle control device, the combination with a throttle pedal of a motor vehicle, to hold the fuel feeding mechanism at any set position, a cup shaped metal case, two guiding apertures in the base thereof, a bar or means affixed to the inner wall, a metal disc or gripping means, a U slot on the edge, the said disc inserted into the cupped case under said bar or means, a control release lock shaft, a threaded cap at the top, a notch below the cap projected thru the said U slot in the disc, thru a guiding aperture in the base of the cupped case, a horizontal pin thru the center of the said shaft resting upon the upper side of the disc, a throttle pedal control rod bossed at the end projected thru the centered guiding aperture in the base of said cupped case, thru a coil spring and oval aperture in the said disc or gripping means assembled to the under side of a throttle pedal with a coupling means.

5. In a throttle control device the combination with the accelerator mechanism foot pedal of a motor vehicle, to hold said mechanism at any set position, a cup shaped metal case, a bar or means affixed to the inner wall, a metal disc or gripping means, an oval aperture in the center, a U slot on the edge, the said disc inserted into the cup under the bar or means, a coil spring below the disc, a control release lock shaft, a threaded adjustment cap at the top, a notch below the cap with a horizontal pin thru the center projected thru the U slot in the disc and offset guiding aperture in the base, the horizontal pin resting upon the upper side of said disc extending beyond the sides of the U slot, a throttle pedal control rod bossed at the top inserted thru a centered guiding aperture in the base of the cupped case, thru the coil spring and oval aperture in the said disc, a cover plate with an aperture seat therein thru which projects the upper end of the said control release lock shaft, an oval guiding aperture in the center of said cover plate thru which protrudes the bossed end of the throttle pedal control rod attached to the under side of the accelerator pedal with a coupling means.

6. In a throttle control device, the combination with the accelerator mechanism of a motor vehicle to hold the said mechanism at any set position and release the same with the accelerator or throttle pedal, a cup shaped metal case inserted thru or attached to the under side of the floor-board below the throttle pedal, a metal or gripping means anchored under a bar or means affixed to the inner wall of the cup, a coil spring below the disc, a throttle pedal control rod, bossed at the end projected thru a centered guiding aperture in the base, thru the coil spring and oval aperture in the said disc and a cover plate and attached to the under side of the said throttle or accelerator pedal, a control release lock shaft, a threaded cap at the top, a locking notch below the cap, a horizontal pin thru the center, the said shaft protruding thru a U slot in the edge of the disc or gripping means and an offset guiding aperture in the base of the cupped case, the pin extending over the sides of the U slot on the upper surface of the disc, the capped end of said control release lock shaft projecting thru an aperture seat in the cover plate, a miniature spring in said aperture seat behind the said shaft to force the notch therein into the aperture seat when the throttle pedal is quickly depressed to the floor-board, holding the disc or gripping means horizontal with the base of the cupped case releasing the grip of the said disc on the accelerator pedal control rod, allowing it to move up and down freely when the notch is seated.

7. In a throttle control device, the combination with a throttle pedal to hold the fuel feeding mechanism of a motor vehicle at any set position, releasing said mechanism with the clutch and brake pedals, a cup shaped metal case and cover affixed to the floor-board beneath a throttle pedal, a control rod attached thereto projected thru the cover, an oval aperture in a disc or gripping means anchored under a bar or means affixed to the inner wall, thru a coil spring and guiding aperture in the base of said cup, a control release lock shaft projected thru an aperture seat in the cover, a U slot on the edge of said disc, a pin horizontally thru said shaft resting on the upper side of said disc, the lower end of the said control shaft extending thru an aperture guide in the cupped case, a formed rod assembled to the end of said shaft with a pin and fixedly fastened to the floor-board with loosely fitted bearing cleats, the remote end having an eye extending downward assembled to a threaded end of a second formed rod a coil spring thereon, the remote end loosely fitted thru a cylindrical cam coupling affixed to the floor-board with a cleat and a rod paralleling the clutch and brake extension arms affixed to the wall of said coupling with a bar across the said extension arms affixed to the remote end of said rod to open the cam by depression of the clutch or brake pedals manipulating the first mentioned rod assembled to the control release lock shaft, drawing it downward releasing the grip of the disc on the throttle pedal control rod, a spring coiled on the cam coupling returning the bar to its original position before depressing the pedals and the spring on the rod assembled to the said cam coupling reseats the cam.

8. In a throttle control device, the combination with the fuel feeding mechanism of a motor vehicle, to hold said mechanism at any set position, releasing same with the clutch and brake pedals, a cup shaped metal case inserted thru or attached to the under side of the floor-board, a metal disc or gripping means in the cup under a bar or means affixed to the inner wall, a coil spring below the said disc, a throttle pedal control rod assembled to the said throttle pedal extending thru an oval aperture in the cover plate and disc, thru the coil spring and guiding aperture in the base of the cupped case, a control release lock shaft with a threaded cap, a notch below the cap projecting thru an aperture seat in the cover plate, a U slot at the edge of the disc and guiding aperture in the base of said cupped case, a pin horizontally thru the control release lock shaft resting upon the upper side of the disc, a miniature coil spring in the aperture seat in the cover plate behind said shaft, a formed rod assembled to the lower end of the said shaft and attached to the under side of the floor-board with loosely fitted bearing cleats, an eye extending downward at the remote end of said formed rod, a second rod threaded at the end assembled thru the latter mentioned eye with a nut for adjustment, a coil spring threaded upon said rod, the remote end loosely fitted thru a cylindrical cam coupling fixedly fastened with a cleat, a rod affixed to the wall of said cam coupling paralleling the clutch and brake extension arms a bar affixed to the remote end thereof extending across the said extension arms, said bar when depressed with either the clutch or brake pedals opening the cam coupling, thereby manipulating heretofore mentioned rods, which draws the control release lock shaft downward the same as depressing it from the top, releasing the grip of the disc or gripping means on the accelerator pedal control rod, seating the notch in the said control release lock shaft allowing free movement up and down of the throttle pedal as before installation.

THOMAS S. DIVER.